(12) United States Patent
Dawley et al.

(10) Patent No.: US 9,577,473 B2
(45) Date of Patent: Feb. 21, 2017

(54) POWER-CENTRIC SYSTEM MANAGEMENT

(75) Inventors: Robert A. Dawley, Creedmoor, NC (US); Richard J. Billingsley, Rossland (CA); Andrew Benton, Blue Bell, PA (US)

(73) Assignee: Electronic Systems Protection, Inc., Zebulon, NC (US)

( * ) Notice: Subject to any disclaimer, the term of this patent is extended or adjusted under 35 U.S.C. 154(b) by 1196 days.

(21) Appl. No.: 13/618,306

(22) Filed: Sep. 14, 2012

(65) Prior Publication Data

US 2013/0073060 A1 Mar. 21, 2013

Related U.S. Application Data

(60) Provisional application No. 61/535,105, filed on Sep. 15, 2011.

(51) Int. Cl.
| | |
|---|---|
| G05B 11/01 | (2006.01) |
| G05D 3/12 | (2006.01) |
| G05D 5/00 | (2006.01) |
| G05D 9/00 | (2006.01) |
| G05D 11/00 | (2006.01) |

(Continued)

(52) U.S. Cl.
CPC ............... *H02J 13/001* (2013.01); *H02J 3/14* (2013.01); *H02J 13/0062* (2013.01); *H02J 13/0079* (2013.01); *Y02B 70/3225* (2013.01); *Y02B 90/2638* (2013.01); *Y02B 90/2669* (2013.01); *Y04S 20/222* (2013.01); *Y04S 40/124* (2013.01); *Y04S 40/128* (2013.01)

(58) Field of Classification Search
USPC .......................................... 700/22, 286, 297
See application file for complete search history.

(56) References Cited

U.S. PATENT DOCUMENTS

| | | |
|---|---|---|
| 5,572,438 A | 11/1996 | Ehlers et al. |
| 6,830,477 B2 | 12/2004 | Vander Vorste et al. |

(Continued)

FOREIGN PATENT DOCUMENTS

EP 2512092 A1 10/2012

OTHER PUBLICATIONS

International Search Report and Written Opinion in counterpart International Application No. PCT/US2012/055786, mailed Nov. 20, 2012.

(Continued)

*Primary Examiner* — Ronald Hartman, Jr.
(74) *Attorney, Agent, or Firm* — Edell, Shapiro & Finnan LLC

(57) ABSTRACT

A plurality of controllers, each coupled to a plurality of outlets, compare values assigned to characteristic parameters or "process variables" against at least one control value on the process variable. The values for the process variables are derived from at least one signal provided to corresponding controllers. At least one of the outlets at each controller is configured to selectively provide an electrical voltage from an input voltage in accordance with the comparison of the process variable values and the control value. Remotely accessible controls may be stored at the controllers which may be retrieved through respective network interfaces at the controllers. A remote processor may use the retrieved controls to remotely specify, such as over a communication network, the control values.

14 Claims, 18 Drawing Sheets

(51) Int. Cl.
  *G05D 17/00*  (2006.01)
  *H02J 13/00*  (2006.01)
  *H02J 3/14*  (2006.01)

(56) References Cited

U.S. PATENT DOCUMENTS

| | | |
|---|---|---|
| 2004/0193329 A1 | 9/2004 | Ransom et al. |
| 2007/0050443 A1 | 3/2007 | Ewing et al. |
| 2007/0276548 A1* | 11/2007 | Uzunovic ............... G06F 1/266 |
| | | 700/297 |
| 2009/0058185 A1 | 3/2009 | Schoettle |
| 2009/0102294 A1 | 4/2009 | Hodges et al. |
| 2009/0234512 A1 | 9/2009 | Ewing et al. |
| 2009/0271642 A1 | 10/2009 | Cheng et al. |
| 2009/0281742 A1 | 11/2009 | Carter et al. |
| 2010/0145542 A1* | 6/2010 | Chapel ................... G05B 15/02 |
| | | 700/295 |
| 2010/0312412 A1 | 12/2010 | Haugh |
| 2010/0328849 A1* | 12/2010 | Ewing .................... G06F 1/266 |
| | | 361/622 |
| 2011/0031950 A1 | 2/2011 | Hodges et al. |
| 2011/0172792 A1 | 7/2011 | Shinohara et al. |
| 2011/0202193 A1 | 8/2011 | Craig et al. |
| 2012/0173033 A1* | 7/2012 | Tischer ................... H02J 3/14 |
| | | 700/295 |

OTHER PUBLICATIONS

Supplementary European Search Report and European Search Opinion in counterpart European Application No. 12832010.8, mailed May 18, 2015.

\* cited by examiner

Device Setup

| Device Name | Device Name | | | Serial Baud Rate | 9,600 ▶ | BPS | — 912 / — 922 |
|---|---|---|---|---|---|---|---|
| Power Up Delay Time | 5 | Seconds | | Serial Port Requires Login | ☑ | | — 914 / — 924 |
| Reboot Time | 5 | Seconds | | Auto Logout | 20 | Min. | — 916 / — 926 |
| Temperature Display | F ▶ | | | Use History Logging | ☐ | | — 918 / — 928 |
| User Accounts May Clear Shutdown | ☐ | | | Allow Firmware Upgrade | ☐ | | — 920 / — 930 |

940 —

| Outlet | Name | Initial State | ICE |
|---|---|---|---|
| 1 | Outlet 1 | Last ▶ | ☑ |
| 2 | Outlet 2 | Last ▶ | ☑ |
| 3 | Outlet 3 | Last ▶ | |
| 4 | Outlet 4 | Last ▶ | |
| 5 | Outlet 5 | Last ▶ | |
| 6 | Outlet 6 | Last ▶ | |
| 7 | Outlet 7 | Last ▶ | |
| 8 | Outlet 8 | Last ▶ | |
| Aux 1 | Aux 1 | | |
| Aux 2 | Aux 2 | | |
| Save | | | |

| Network Setup | | | |
|---|---|---|---|
| Network Interface | | | |
| IP Setup | DHCP ▼ | | 1012 |
| IP Address | 10.1.2.69 | | 1014 |
| Subnet Mask | 255.255.255.0 | | 1016 |
| Gateway | 10.1.2.1 | | 1018 |
| DNS 1 | 10.1.2.12 | | 1020 |
| DNS 2 | 209.116.84.118 | | 1022 |
| Web HTTP Port | 80 | | 1024 |
| Web HTTPS Port | 443 | SSL Required ☐ — 1025 | 1026 |
| Enable Telnet | ☑ | | 1028 |
| Telnet Port | 23 | | 1029 |
| Email | | | |
| Enable Email | ☐ | | 1030 |
| Email Server | | | 1032 |
| Login Name | | | 1034 |
| Login Password | | | 1036 |
| Return address | | | 1038 |
| Auto Retry | 1 ▼ | | 1040 |
| Test Email | | Send | 1042 |
| Time Server | | | |
| Set Time | SNTP ▼ | | 1044 |
| SNTP Server | nist 1-ny.ustiming.org | | 1046 |
| Time Zone Offset | -5 ▼ | | 1048 |
| Use DST | ☑ | | 1050 |
| DST Start Date | 3.2.0/2:00:00 | Month/Week/Day 24H:Min | 1052 |
| DST Stop Date | 11.1.0/2:00:00 | Month/Week/Day 24H:Min | 1054 |
| Manual Time Set | | Month/Day/Year 24H:Min | 1056 |
| Save | | | |

Network Reporting Setup

SNMP

| | | |
|---|---|---|
| Enable SNMP | ☐ | — 1112 |
| Read Community | public | — 1114 |
| Write Community | private | — 1116 |
| SNMP Managers | 1  0.0.0.0 | |
| | 2  0.0.0.0 | — 1118 |
| | 3  0.0.0.0 | |
| | 4  0.0.0.0 | |
| Traps Sent | ☑ Manual Control    ☑ NetTest Trigger | — 1120 |
| | ☑ System Trigger    ☑ Schedule Trigger | |
| | ☑ Threshold Trigger | |

IDEP

| | | |
|---|---|---|
| IDEP Port | 9100 | 0 = disabled — 1122 |
| IDEP Manager | | — 1124 |
| IDEP Status Broadcast | ☐ Enabled  1 | Frequency (1-10 Minutes) — 1126 |
| IDEP Event Reporting | ☑ Manual Control    ☑ NetTest Trigger | — 1128 |
| | ☑ System Trigger    ☑ Schedule Trigger | |
| | ☑ Threshold Trigger | |
| IDEP Encryption | ☐ Enabled | Passphrase — 1130 |

SYSLOG

| | | |
|---|---|---|
| Syslog Port | 514 | 0 = disabled — 1132 |
| Syslog Server | 0.0.0.0 | — 1134 |

[ Save ]

Users Setup

| User | Assigned Rights | | | | | | | | | | Modify |
|------|-------|---|---|---|---|---|---|---|---|-------|--------|
|      | Admin | 1 | 2 | 3 | 4 | 5 | 6 | 7 | 8 | Aux 1 | Aux 2 | |
| admin | Y | Y | Y | Y | Y | Y | Y | Y | Y | Y | Y | Edit Delete |
|      | New User 1215 | | | | | | | | | | | 1210 |

FIG.12A

Edit User:

Username _____ 1222   Password _____ 1224
Email _____ 1226   Confirm _____ 1228

Assigned Rights

1231 — | Admin | 1 | 2 | 3 | 4 | 5 | 6 | 7 | 8 | Aux 1 | Aux 2 | — 1230
        | ☐ | ☐ | ☐ | ☐ | ☐ | ☐ | ☐ | ☐ | ☐ | ☐ | ☐ |

Save 1232      Close 1234

Triggers Setup

System Triggers — 1312

| | Trigger | Setpoint | | | Enabled | Hysteresis |
|---|---|---|---|---|---|---|
| 1314 | Over-voltage Auto Shutdown | Greater Than | 150 | Volts | ☑ | 7 |
| 1316 | Under-voltage Auto Shutdown | Less Than | 90 | Volts | ☑ | 7 |
| 1318 | Over-current Auto Shutdown | Greater Than | 20 | Amps | ☑ | 7 |
| 1320 | Over-temperature Auto Shutdown | Greater Than | 100 | Deg | ☑ | 7 |
| 1322 | Self-Test failure Auto Shutdown | | | | ☑ | |

[Save] — 1324

User Triggers

| Type | Name | Modify |
|---|---|---|
| All Off | All Off | Edit Delete Run — 1326 |

[New User Trigger]
1325

| | | Edit Sequence: | | | | | |
|---|---|---|---|---|---|---|---|
| Sequence Name | | 1432 | | | | | |
| Step | Pause | Outlet | Action | Step | Pause | Outlet | Action |
| 1 | 0 | None ▼ | None ▼ | 9 | 0 | None ▼ | None ▼ |
| 2 | 0 | None ▼ | None ▼ | 10 | 0 | None ▼ | None ▼ |
| 3 | 0 | None ▼ | None ▼ | 11 | 0 | None ▼ | None ▼ |
| 4 | 0 | None ▼ | None ▼ | 12 | 0 | None ▼ | None ▼ |
| 5 | 0 | None ▼ | None ▼ | 13 | 0 | None ▼ | None ▼ |
| 6 | 0 | None ▼ | None ▼ | 14 | 0 | None ▼ | None ▼ |
| 7 | 0 | None ▼ | None ▼ | 15 | 0 | None ▼ | None ▼ |
| 8 | 0 | None ▼ | None ▼ | 16 | 0 | None ▼ | None ▼ |

Save — 1442        Close

POWER-CENTRIC SYSTEM MANAGEMENT

RELATED APPLICATION DATA

This application claims the benefit of U.S. Provisional Patent Application 61/535,105 entitled, "Web-Enabled Power Conditioning Management System," filed on Sep. 15, 2011, the full disclosure of which is incorporated herein by reference.

BACKGROUND

Power conditioning devices, or simply power conditioners, are used to improve the quality of electricity provided to equipment connected thereto, such as to maintain a consistent alternating current (AC) supply voltage in response to variations in electrical supply conditions. Power conditioners may include filter circuits to remove electrical noise from the AC supply voltage and suppressor circuits to limit transients/surges in the AC supply voltage, thereby preventing potentially disruptive/damaging conditions from reaching connected equipment. Such power conditioners may have multiple outlets to which the equipment can be connected and through which the conditioned power may be provided. In certain systems, the connected load equipment, regardless of the spatial distribution of such equipment, is treated as a single load, e.g., a voltage surge in the supply power is prevented from entering all equipment connected to the power conditioner. While such measures are practical, and even critical in certain applications, adaptability and fine control afforded by conventional power conditioning systems is limited.

Spatial distribution of load equipment presents other challenges to efficient power conditioning and control, such as when pieces of distributed equipment are supplied electricity from different sources. While spatial distribution may present little impediment in certain applications, other applications require multiple power conditioners to protect each of multiple loads, and carrying out a consistent power conditioning and control scheme over all such connected load equipment may become problematic. Moreover, alerts as to critical conditions, e.g., persistent supply over-voltage, issued from multiple, spatially-separated power conditioning points may delay efforts by personnel to correct such conditions. There is thus an apparent need for monitoring and control over distributed power conditioning points, e.g., at individual power outlets, and for means by which monitoring and control functions may be accessed and modified from a central location.

SUMMARY

A power-centric system has a plurality of outlets distributed over a spatial region, at least one of which is a power outlet. Each outlet is controllable into output states in accordance with states of a corresponding controller. One or more user controls are retrieved from one or more of the controllers over a communication network by a remote processor. The retrieved user controls are used to provide data establishing state transition boundaries on process variable data. Supply voltage and other parameters are monitored by the controllers and measured values thereof are assigned to at least one process variable. The outlets are transitioned into corresponding output states based on a comparison of the process variable with a corresponding transition boundary.

The above and still further features and advantages of the present inventive concept will become apparent upon consideration of the following definitions, descriptions and descriptive figures of specific embodiments thereof. While these descriptions go into specific details of certain embodiments of the inventive concept, it is to be understood that variations may and do exist and will be apparent to those skilled in the art upon review of this disclosure.

BRIEF DESCRIPTION OF THE DRAWINGS

FIG. 9 is an illustration of yet another set of user controls in the form of a Web page by which a device setup interface of the present general inventive concept may be embodied.

FIG. 10 is an illustration of yet another set of user controls in the form of a Web page by which a network setup interface of the present general inventive concept may be embodied.

FIG. 11 is an illustration of yet another set of user controls in the form of a Web page by which a network reporting setup interface of the present general inventive concept may be embodied.

FIGS. 12A-12B are illustrations of yet another set of user controls in the form of Web pages by which a user access control interface of the present general inventive concept may be embodied.

FIGS. 13A-13B are illustrations of yet another set of user controls in the form of Web pages by which an event trigger control interface of the present general inventive concept may be embodied.

FIGS. 14A-14B are illustrations of yet another set of user controls in the form of Web pages by which a sequence control interface of the present general inventive concept may be embodied.

DETAILED DESCRIPTION

Figure 1:
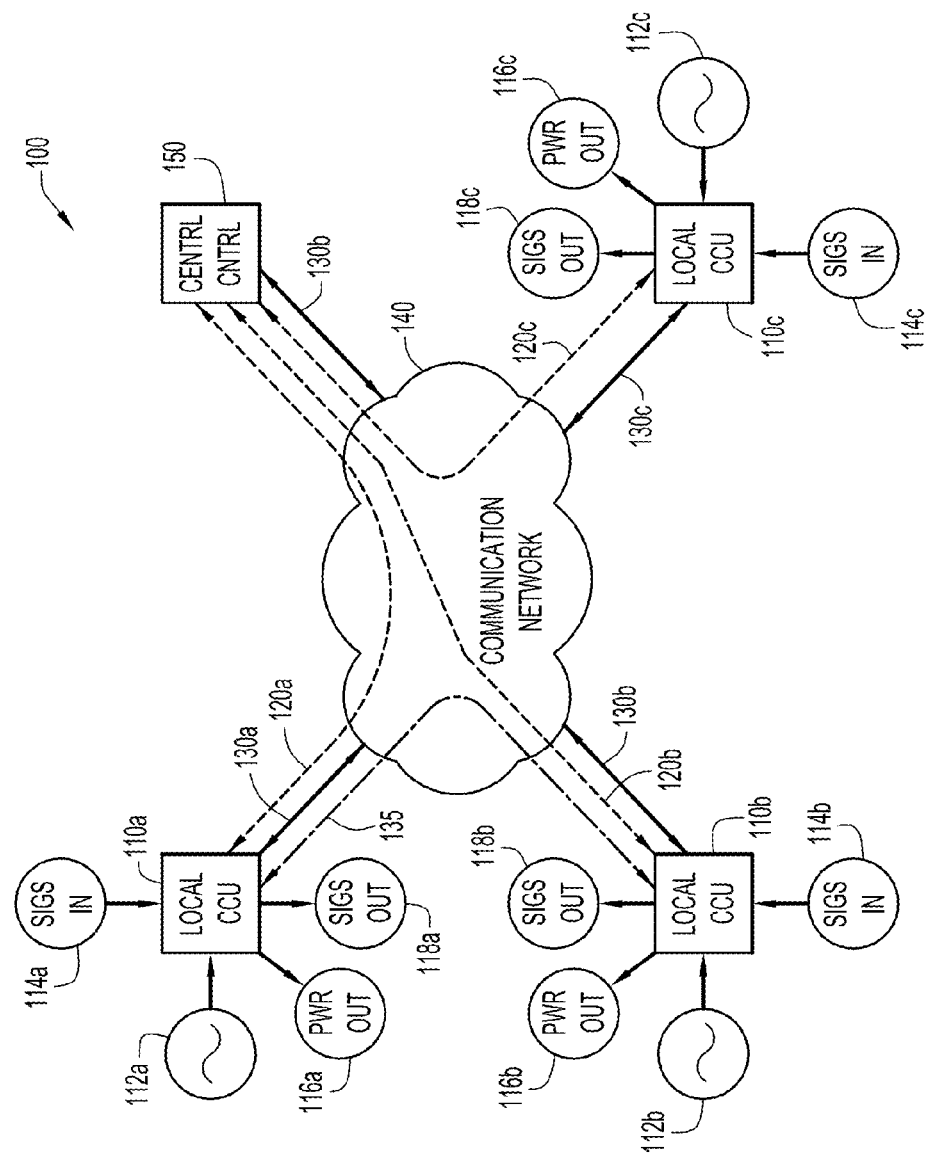
FIG. 1 is a schematic block diagram of a distributed power-centric system by which the present general inventive concept may be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The figures described herein include schematic block diagrams illustrating various functional modules for purposes of description and explanation. Such diagrams are not intended to serve as electrical schematics and interconnections illustrated are merely to depict various interoperations between functional components and/or processes and are not necessarily direct electrical connections between such components. Moreover, the functionality illustrated and described via separate components need not be distributed as shown, and the discrete blocks in the diagrams are not intended to depict discrete electrical components.

As used herein, power conditioning refers to processing of electricity to increase its quality at a load device and to minimize the possibility of damage to both the load device and the power conditioning components upon certain characteristics of the electricity exceeding system tolerance. It is to be noted that the terms power and electricity are used herein synonymously, although it is to be understood that such is not strictly the case. Electric power is the rate of transfer of electric energy, whereas electricity is a phenomenon resulting from the presence and flow of electric charge. The ordinarily skilled artisan will readily ascertain the proper meaning of the terms, "power," and, "electricity," from the context in which the terms are used.

The system described herein is a power-centric system management system, where the term power-centric refers to a power conditioning and control system that include features outside power conditioning and control per se, but are nonetheless useful in a complete system management scheme. Such a power-centric system may provide the capability to monitor and control individual power outlets and customize and/or create power settings on integrated network-addressable power conditioning devices via remote access. Additionally, power-centric management may provide control over various outlets based on externally provided signals and provide control signals to external equipment through, for example, custom sequences from a remote device. Users may receive notifications, such as, for example, by suitably formatted email messages, based on user-defined, predetermined conditions and thresholds, including, for example, outlet status, current draw, power consumption, and ambient temperature.

Referring first to FIG. 1, there is illustrated an exemplary power-centric management system 100 in which power monitoring and control is conducted at various locations by local conditioning and control units (CCUs) 110a-110c, representatively referred to herein as CCU(s) 110. CCUs 110 may be communicatively coupled to a central controller 150 over a communication network 140. Such communication may occur over respective communication channels 130a-130c, representatively referred to herein as communication channel(s) 130.

By way of CCUs 110, power delivered from power sources 112a-112c, representatively referred to herein as power source(s) 112, is conditioned and selectively output at terminals 116a-116c, representatively referred to herein as power output terminal(s) 116. Selectivity as to the provision of power at power output terminals 116 may be predicated upon whether signals provided at signal terminals 114a-114c, representatively referred to herein as signal input terminal(s) 114, meet certain conditions. For example, certain thresholds may be placed on signals provided at signal input terminals 114 and, upon meeting threshold conditions, CCU 110 may compel power at power output terminals 116 to be provided to a connected load (not illustrated) or prevented from such connection. Similarly, signals may be selectively provided at signal output terminals 118a-118c, representatively referred to herein as signal output terminal(s) 118, based upon certain conditions being met at CCUs 110. Such signal provision may be used to control equipment (not illustrated) based upon, for example, certain threshold conditions, where such equipment may or may not be involved in power distribution, condition or control. It is to be understood that other signals, such as those derived from voltages of power source 112 may be used to control the provision of power at power output terminals 116 and signal output terminals 118.

While CCUs 110 may operate autonomously, the parameters by which such autonomous operation proceeds at each CCU 110 may be provided from central controller 150. Accordingly, both independent local and interdependent global power schemes may be centrally managed across all CCUs 110 in communication with central controller 150. To that end, central controller 150 may establish connections 120a-120c, representatively referred to herein as connection(s) 120, in accordance with a predetermined network protocol. As used herein, a connection is an end-to-end flow of data carried over one or more communication channels through which information is exchanged. In certain embodiments, selected CCUs 110 communicate over an expansion connection, representatively illustrated at expansion connection 135. As used herein, an expansion connection is a communication connection between CCUs 110 supported by communication and command protocols particular to distributed power-centric system management. As such, an expansion connection 135 between one CCU 110 and another may use communication and command protocols that are only used therein and not used in other connections 120.

In an example application, output power terminals 116 are distributed in accordance with the placement of equipment to which they are to provide power. One or more such distributed output power terminals 116 may be controlled by a corresponding CCU 110, which may or may not be proximate to the output terminals 116 under its control. Input signals may be provided to input signal terminals 114, such as through a wire or cable, and external equipment, including equipment being provided power through CCU 110, may be connected to output signal terminals 118. Communications between central controller 150 and CCUs 110 may be established through connections 120 over channels 130. In certain embodiments and/or applications, expansion connections, such as expansion connection 135, may be established between, for example, CCU 110a and CCU 110b. CCU 110b may serve as an expansion unit to a master unit realized by CCU 110a. That is, CCU 110a may be configured to communicate with CCU 110b over expansion connection 135 and access by central controller 150 to CCU 110b is provided indirectly through CCU 110a. In so doing, control over both CCUs 110a and 110b may be achieved through controls provided on CCU 110a, as will be discussed in detail below. However, it is to be understood that central controller 150 may access CCU 110b directly over connection 120b, but control over both CCUs 110a and 110b through a single common interface at central controller 150 would, in certain embodiments, occur over connection 120a to CCU 110a and over expansion connection 135 between CCUs 110a and 110b.

Load equipment (not illustrated) may be electrically connected to power output terminals 116 and, optionally, to input signal terminals 114 and to output signal terminals 118. Provided no critical errors occur as a result of such connections, e.g., over-voltage at the input from a source 112, conditioned power is provided to each load through a corresponding power output terminal 116. Power-centric parameters, referred to herein as process variables including, for example, input and output voltages, input and output current, power consumption, environmental conditions, signals at input signal terminals 114, etc., are continually monitored for compliance with operational specifications. The specifications on such process variables may be fixed by default, such as to manufacturer's design criteria, while the specifications on other process variables may be modified by the user. Upon a value of a process variable falling outside the specifications, various actions may be taken, where certain such actions are fixed by default, e.g., automatic shutdown upon detection of the voltage provided by power source 112 exceeding maximum tolerance, and other actions may be modified by the user.

Figure 2:
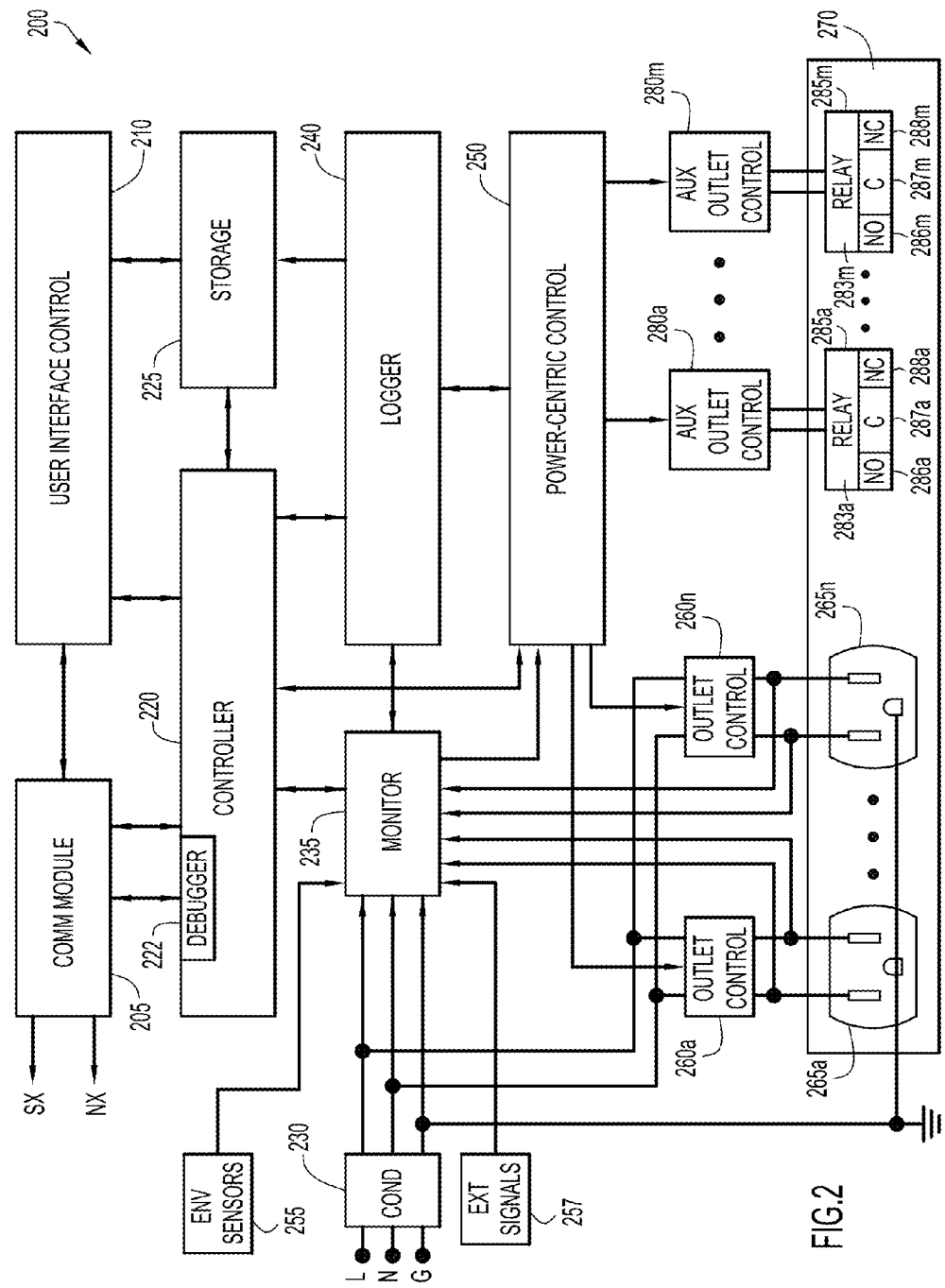
FIG. 2 is a schematic block diagram of a power-centric system by which the present general inventive concept may be embodied.

In FIG. 2, there is illustrated an exemplary power-centric conditioning and control system (PCCS) 200, by which relatively local power-centric control, such as described above with reference to CCUs 110 in FIG. 1, may be implemented. PCCS 200 may be contained in a rack-mounted enclosure 270, although many other mounting systems may be used. In one application, PCCS 200 is embodied to prevent alternating current (AC) supply surges and electrical transients from entering audio-visual (AV) equipment, which can disrupt sound quality and digital audio performance. PCCS 200 may include elements that provide common mode and normal mode EMI/RFI filtering, inrush current elimination (ICE) and catastrophic over/under voltage shutdown.

PCCS 200 may be electrically coupled to a power source 112 at input terminals L, for an AC line conductor, N, for an AC neutral conductor, and G for a ground conductor. PCCS 200 may include a plurality of power output terminals 116 in the form of power outlets 265a-265n, representatively referred to herein as power outlet(s) 265, from which electrical loads electrically coupled thereto draw electrical power. The input terminals L, N and G and the power outlets 265 may be accessible from the exterior of the enclosure 270. It is to be understood that while PCCS 200 is illustrated as a single-phase AC power conditioning and control system, other input configurations, including multiphase AC, can be used in conjunction with the present invention without departing from the spirit and intended scope thereof.

Power outlets 265 may be independently controlled to, for example, selectively connect and disconnect the loads to and from the conditioned power based on, for example, values assigned to certain process variables. To that end, each outlet 265 may be controlled by an associated power outlet controller 260a-260n, representatively referred to herein as power outlet controller(s) 260. Power outlet controller 260 may be operated by a signal from power-centric controller 250 such as, for example, in response to an input voltage transient/surge. Additionally, power outlets 265 may be monitored and some action may be performed based on some outlet condition, such as, for example, disconnecting the load in response to high power consumption by a load.

In similar fashion, PCCS 200 may include plurality of signal output terminals 118 of the form of auxiliary outlets 285a-285m, representatively referred to herein as auxiliary outlet(s) 285. In certain embodiments, auxiliary outlets 285 include a switch mechanism, such as relays 283a-283m, representatively referred to as relay(s) 283, by which signals may be provided to external equipment (not illustrated). For example, relays 283 may include respective common (C) terminals 287a-287m, representatively referred to herein as C terminal(s) 287, normally-open (NO) terminals 286a-286m, representatively referred to herein as NO terminal(s) 286, and normally-closed (NC) terminals 288a-288m, representatively referred to herein as NC terminal(s) 288. The operation of relays 283 may be responsive to a signal from respective auxiliary controllers 280a-280m, representatively referred to as auxiliary controller(s) 280, to switch between a normally-open/normally-closed (NO/NC) state to a complementary open/closed (O/C) state. In certain applications, a control signal connected at C terminal 287, from, for example, an external device, may be transferred between NO terminal 286 and NC terminal 288 based upon a state of auxiliary controller 280. The ordinarily skilled artisan will recognize that switching and signaling mechanisms other than relays may be used in conjunction with the present invention without departing from the spirit and intended scope thereof.

Power outlets 265 and auxiliary outlets 285 may be controlled through similar mechanisms, however it is to be understood that the electrical current delivered through power outlets 265, referred to herein as power level current, may be significantly greater than the current delivered at auxiliary outlets 285, referred to herein as signal level current. It is to be understood as well that auxiliary outlets 285 may accommodate either AC control signals or direct-current (DC) control signals.

Power-centric controller 250 may provide system-wide power-centric control in accordance with which power is provided to power outlets 265 and with which signals are controlled at auxiliary outlets 285. To that end, power-centric controller 250 may be provided data from sources throughout the system from which control decisions can be made. For example, the input power may be conditioned by a suitable power conditioner 230 and provided to a monitor 235. Monitor 235 may, in turn, provide data to power-centric controller 250 indicative of voltage and/or current levels of the input power. Power-centric controller 250 may compare the input power levels with decision criteria, the results of such may compel appropriate action to be taken. Monitor 235 may be similarly provided signals indicative of load power characteristics, e.g., load current, energy consumption, etc., as well as signals from one or more environmental sensors 255, such as those that convert temperature, humidity, vibration and the like into electrical signals, and from other external signals 257 provided at input signal terminals 114. Data indicative of such signals may be provided by monitor 235, such as by analog-to-digital conversion and digital signal processing, to power controller 250 at which power-centric control decisions may be made.

Power-centric controller 250 may also perform certain actions that have been programmed by a user. For example, PCCS 200 may incorporate an Application Programming Interface (API) comprising a set of commands and/or procedures that allow a user to customize the system performance, where such performance can be controlled at the outlet level. The user may utilize the API to construct a user program that establishes an action to be taken, such as a change of state in at least one of the power or auxiliary outlets, logging an event, and/or issuing alerts or alarms. A user program may include one or more program operations that compels an action in response to user-defined thresholds on measured electrical power parameters, environmental state, external signal state, or simply to define a power-up or power-down sequence at outlets 265. Other possible user programs may be created as the ordinarily skilled artisan will recognize upon review of this disclosure. The creation and use of user programs is described in more detail below.

PCCS 200 may include a system controller, or simply controller 220, that coordinates operations between functional components thereof. For example, controller 220 may pass data and messages between components and make any cross-component format translations as necessary. Additionally, controller 220 may perform numerical computations, process interrupts, implement timers, format data for storage in storage unit 225, retrieve data from storage unit 225 on behalf of other functional components, and perform other such system control functionality. The present invention is not limited to a particular implementation of controller 220; such may be implemented by a wide array of suitable machine and/or process control methodologies without departing from the spirit and intended scope of the present invention.

Controller 220 may execute a debugger 222 which may be used to identify various system problems including those that occur in a particular user program. Additionally, debugger 222 may be utilized to identify proper operation of hardware and/or software of PCCS 200. Debugger 222 may be activated and deactivated by a user, such as a technician, in accordance with properly formatted commands for such provided to controller 220. Debugger 222 may be implemented in a wide array of debugger technologies as will be recognized by the ordinarily skilled artisan upon review of this disclosure.

Figure 3:
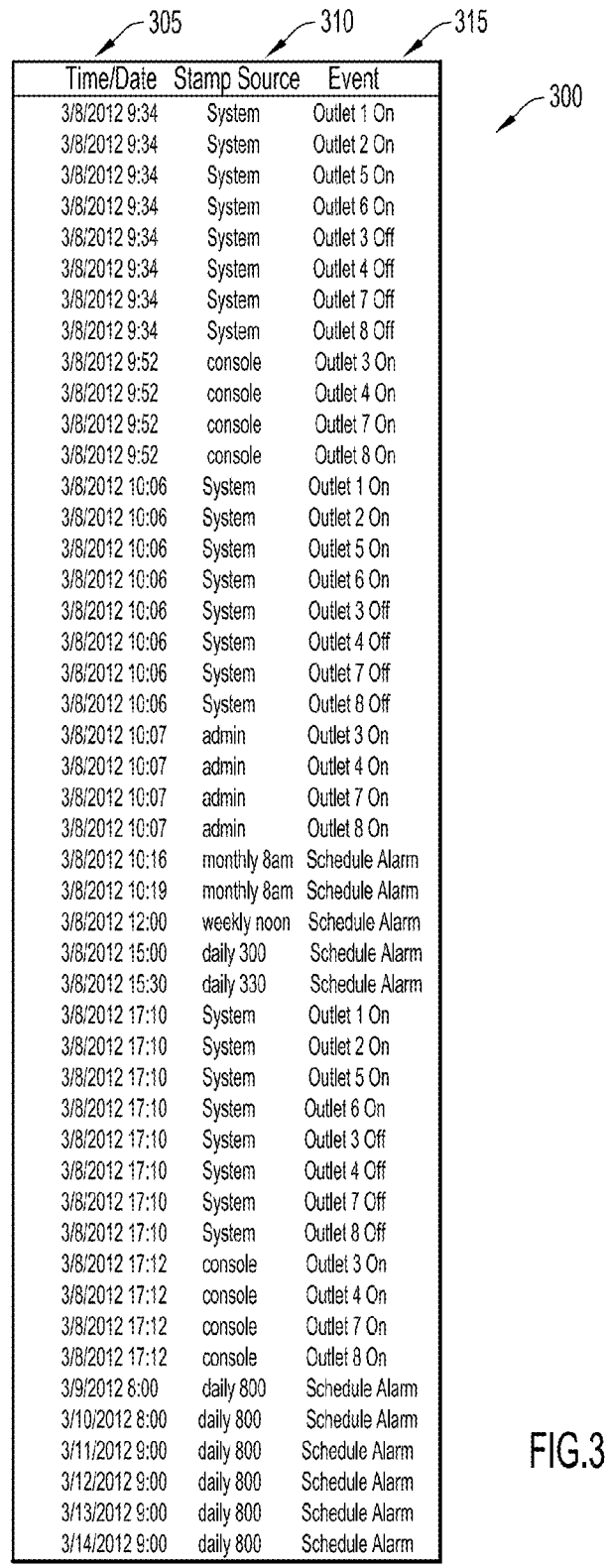
FIG. 3 is an illustration depicting an example log file provided by embodiments of the present general inventive concept.

PCCS 200 may include a data logger 240 to record events that occur during operation thereof. As used herein, an event is a measured quantity in a process variable that exceeds the bounds established therefor. The values of process variables are assigned from measured quantities, e.g., measurements of input voltage level, input current level, output voltage level, output current level, power consumption, input connection polarity, temperature, humidity, external signal level, etc., and are evaluated against respective criteria at selected times. The criteria on the process variables, such as numerical bounds thereon, may be established by hard-coded mechanisms in PCCS 200 to, for example, protect sensitive system functions and/or connected equipment that would be impaired if such criteria were to be exceeded. Other bounds may be established by a user through, for example, a user program. The crossing of these bounds constitutes an event, as used herein, and data logger 240 tracks such events and stores information regarding these events in a log file in storage unit 225. Such a log file is exemplified in FIG. 3 as log file 300. As illustrated in the figure, log file 300 contains a time/date stamp 305 indicating a time at which a corresponding event occurred, an indication of a source 310 that precipitated the event, and a description 315 of the event. For example, an event may occur due to a power anomaly, e.g., an input over-voltage, in which case the source of the event may be indicated in log file 300 as coming from System. Other events may also be recorded in log file 300 as well. Events occurring from manual control through a user interface may be indicated in log file 300 as coming from Console. User program events may be indicated in log file 300 as coming from Admin. Scheduled events may be indicated in log file 300 to include the time at which a particular scheduled alarm was set to occur.

Periodically or upon command, log file 300 may be retrieved from storage 225, such as by controller 220, and provided to interested parties through a communication channel controlled by communication module 205. It is to be understood that an event may compel performance of some action in addition to logging the event, as will be described in more detail below. Additionally, logger 240 is not limited to logging only events; other data may be tracked and logged by a data logger 240 in accordance with the application in which the present invention is embodied.

Communication module 205 provides mechanisms by which access to PCCS 200 may be obtained by an external device. Communication module 205 may include transmitters, receivers, coders, decoders, modulators, demodulators, buffers and other such functional components to implement communications per one or more communications technologies and protocols. Such technologies and protocols may include wireless transmission and media access including radio frequency and optical transmission, wired electromagnetic media access, packet-switched and circuit-switched networks, and corresponding data format and transmission protocols, and so on. For purposes of description and not limitation, communication module 205 implements a serial communication interface Sx, such as a Universal Serial Bus (USB) interface, and a network interface Nx, such as an Ethernet interface. Through either interface Sx or Nx, one or more corresponding communication channels can be constructed and communication may be carried out in end-to-end connections constructed in the communication channels.

PCCS 200 may include a user interface controller 210 to provide user controls by which a user can establish and modify PCCS operation. The present invention is not limited to a particular user interface architecture. However, in typical applications, the user interface affords flexible control over PCCS 200 operations at an arbitrary point of access. To that end, the user controls may be stored in onboard memory, such as storage unit 225, and retrieved through a communication channel by an external device. Accordingly, such an external device can operate PCCS 200 from anywhere provided that a communication connection can be constructed between the external device and PCCS 200. Such an interface may be achieved by, for example, Hypertext Markup Language (HTML) coded pages of user controls that are retrieved by requests conveyed through the Hypertext Transfer Protocol (HTTP). When so embodied, activation of a user control may be associated with a command that is also conveyed through HTTP.

In normal operation, PCCS 200 may receive supply power through input terminals L, N and G, which may be filtered and conditioned by conditioner 230. The conditioned supply power may then be monitored through monitor 235, which converts the input power, through a measurement of voltage and/or current, into a representative signal indicative thereof. Monitor 235 may also provide representative signals indicative of, for example, load current draw and power consumption at outlets 265. The representative signals may be provided to power-centric controller 250 and used thereby to make power-centric control decisions against control parameters. Additionally, the representative signal from monitor 235 may be provided to data logger 240 which may store the input power levels in storage unit 225 for various reports. Still further, power-centric controller 250 may receive representative signals from environmental sensors 255 and external signals 257 via monitor 235, which may also be used to make power-centric control decisions.

Using the monitored parameters, multiple and diverse control schemes may be achieved by embodiments of the present invention. For example, upon the input voltage crossing a maximum safe voltage threshold level, power-centric controller 250 may cause power outlet controllers 260 to transition into a nonconductive state, thereby removing unsafe voltage levels from attached loads. As another example, if a load attached to corresponding power outlet 265 is consuming power beyond an established threshold, power controller 250 may compel outlet controller 260 to transition into a nonconductive state. In yet another example, upon a determination of environmental temperature exceeding some threshold, as measured by environmental sensors 255, power-centric controller 250 may cycle the power at power outlets 265, i.e., remove power from certain loads for a predetermined cycle time subsequent to which other loads will have power removed while the previously powered down outlets 265 will be powered up. Such cycling may continue per, for example, a user-programmed schedule established for over-temperature conditions, until the environmental temperature falls to within established limits. In each of these cases, the occurrence of the event will compel indication of such to data logger 240, which may record the occurrence of the event, as described above.

It is to be understood that not all events need compel a power control action; certain control parameters may be set to indicate an event that need only be logged. For example, a voltage threshold may be established by a user, the crossing of which by the input voltage may be logged solely for diagnostic purposes. This voltage threshold may be set to a voltage level that is below an unsafe overvoltage level and/or above an unsafe undervoltage level where power control action would normally be compelled. Thus, during a diagnostic phase subsequent to, for example, chronic unsafe overvoltage events, logged data indicating a trend towards the unsafe voltage levels, by way of crossing the lower voltage threshold, may be useful to the technician to locate power and/or equipment problems.

The control parameters against which power-centric controller 250 makes control decisions may be achieved by accessing user interface controller 210 through a communication channel constructed through communication module 205. User interface controller 210 may form a user interface on a possibly remote end user device, such as a computer, a cell phone, and the like, on which user controls are provided, to make changes to the control parameters and/or process variable criteria. For example, one user control may allow the user to modify the aforementioned unsafe overvoltage threshold from a default value, thereby creating new user-programmed decision criteria. In another example, user controls may be presented on the user interface by which a sequence of power related operations can be established and modified. The present invention is not limited to any set of control parameters and user controls by which such parameters are established and modified. Many alternative configurations to those illustrated and described herein can be used in conjunction with the present invention without departing from the spirit and intended scope thereof.

Figure 4:
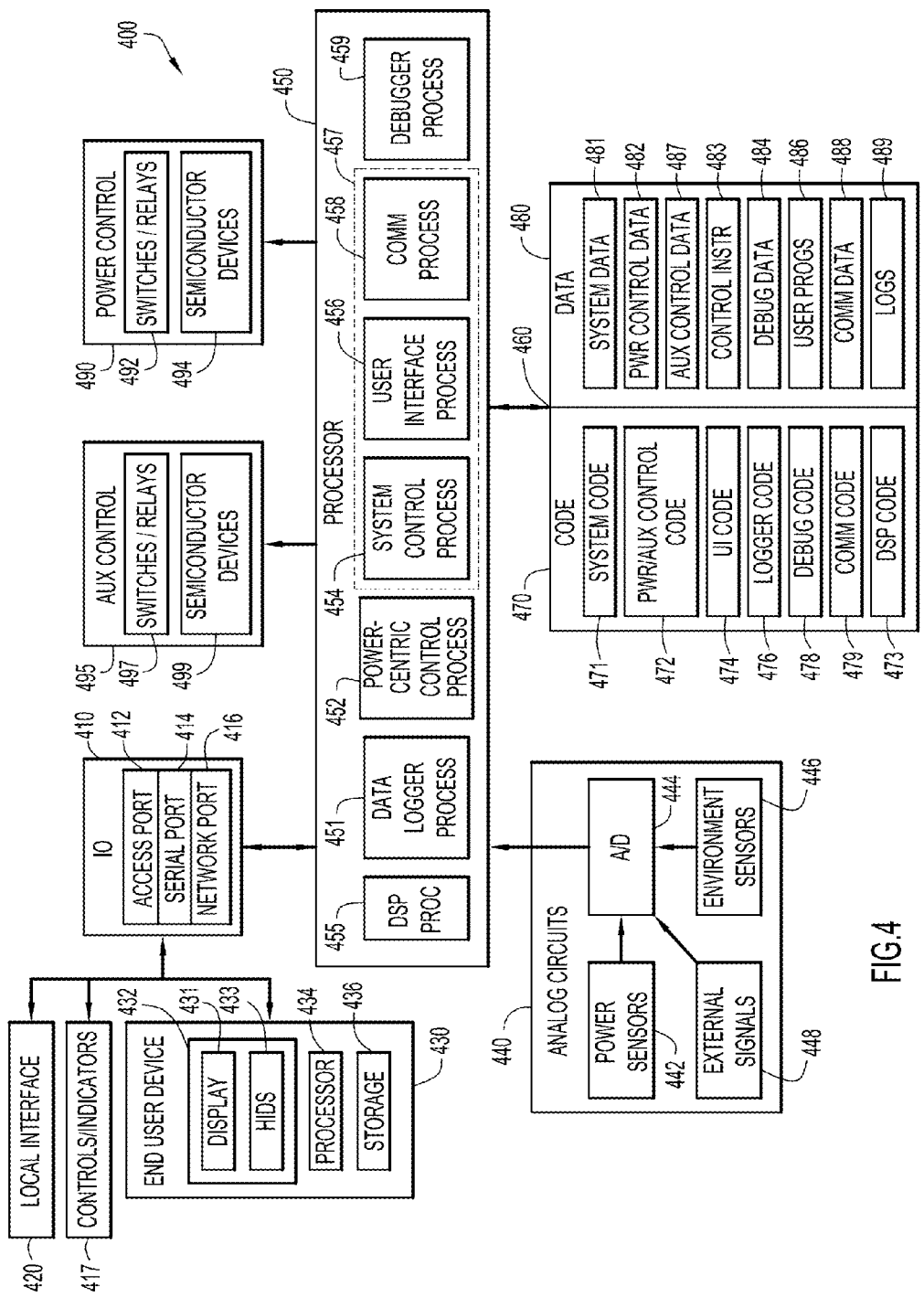
FIG. 4 is a functional block diagram of a power-centric controller by which the present general inventive concept may be embodied.

In FIG. 4, there is illustrated an exemplary power-centric processor (PCP) 400 by which operation and control processes described with reference to PCCS 200 in FIG. 2 can be carried out. PCP 400 may include a processor 450, such as a microprocessor or microcontroller, a memory subsystem 460 communicatively coupled to processor 450 and an input/output (I/O) subsystem 410 communicatively coupled to processor 450. Additionally, PCP 400 may include one or more analog circuits 440 by which controller inputs may be measured. For example, analog circuits 440 may include one or more power sensors 442 that may be used to obtain signal representations of input power, e.g., input voltage and/or input current, and signal representations of outlet power, e.g., outlet voltage and/or outlet (load) current. Such signal representations may be achieved by, for example, rectification of the supply AC voltage and converting the resulting DC voltage into a sequence of numerical samples through the use of an analog-to-digital converter (A/D), representatively illustrated at A/D converter 444. In certain embodiments, additional circuitry and/or processes carried out on processor 450, such as digital signal processing (DSP) process 455, may be used to determine a root-mean-squared (RMS) value from the sinusoidal waveform of the supply AC voltage. Analog circuits 440 may also include environmental sensors 446, such as thermocouples, digital thermometers, humidity sensors, accelerometers, acoustic transducers, and the like by which the environment within and surrounding PCCS 200 can be monitored. Such transducers produce an electrical signal indicative of the environmental variable for which they are adapted and the electrical signals may be converted into a sequence of numerical samples by another A/D converter 444. Additional analog circuitry may be implemented to accept external signals, as illustrated by external signals circuit block 448.

Analog circuits 440 may produce values for process variables on which proper power control depends. Based on the values for the process variables, the control of power-centric systems is achieved through power control circuits 490, which may include switches and relays 492 and/or semiconductor switch devices 494, that electrically connect outlets 265 (FIG. 2) to the corresponding electrical source. Similarly, auxiliary control circuits 495, which may include switches and relays 497 and semiconductor devices 499, may also be operated in accordance with the values assigned to the process variables.

I/O subsystem 410 may be implemented in hardware and software to implement an interface between external systems and processor 450. Exemplary I/O subsystem 410 includes a network port 416, such as an Ethernet port for communications with a communications network, a serial port 414 through which serial communications can be conducted and a general access port 412 which may be used for connecting specialized equipment, computer peripherals, and the like. For example, access port 412 may be configured to provide signals to controls and indicators 417, such as external switches and the like, audible buzzers, sirens and the like, and indicators, such as lamps, light emitting diodes (LEDs) and the like. Such controls and indicators may provide visual and audible notification of operations of PCCS 200 and of events detected thereby, and may accept user input through signals from switches, potentiometers, etc., included in controls and indicators 417.

I/O subsystem 410 may afford communications with a variety of external communication devices. For example, a local interface device 420 may implement a simple terminal through serial port 414, by which, among other things, diagnostic operations can be performed. As another example, a remote processor, such as end user device 430, may be communicatively coupled to PCP 400 through network port 416 through which a communication channel may be constructed in a wider network operating under, for example, the Transmission Control Protocol/Internet Protocol (TCP/IP) suite. The present invention is not limited to specific communication techniques and protocols and the ordinarily skilled artisan will recognize numerous such communication techniques that may be used in conjunction with the present invention without departing from the spirit and intended scope thereof.

End user device 430 may include a user interface 432 that includes a display 431 and a set of Human Interface Devices (HIDs) 433. Additionally, end-user device 430 may include a processor 434 and storage 436, by which a program may be executed to interact with PCP 400 through user interface process 456, as will be described in more detail below.

Memory subsystem 460 may be segmented into a code segment 470 in which to store processor instructions and data segment 480 in which to store variable data. Processor 450 may be configured to execute the processor instructions stored in code segment 470 to thereby carry out various processes implementing the processing control functionality of PCCS 200. For example, processor 450 may execute DSP code 473 to carry out DSP process 455, system code 471 to carry out system control process 454, power/auxiliary control code 472 to carry out power-centric control process 452, user interface code 474 to carry out user interface process 456, data logger code 476 to carry out data logger process 451, debugger code 478 to carry out debugger process 459 and communication code 479 to carry out communication process 458.

DSP process 455 may perform signal processing and mathematical operations on digital data generated from A/D 444 and other digital signals. Such processing may include, without being limited to, RMS calculations, digital filtering, and data averaging. The ordinarily skilled artisan will recognize and appreciate a wide variety of DSP techniques that can be incorporated into embodiments of the present invention without departing from the spirit and intended scope thereof.

System control process 454 may implement the functionality of system controller 220 in FIG. 2. System control process 454 may, in addition to those functions described above with regard to controller 220, allocate memory, allocate processor time, coordinate time-sharing among processes executing on processor 450 and other such tasks as required to provide a stable data processing and control platform for purposes of power-centric control. System control process 454 may store the processor state during context switching and the like, as well as other variable data, in data segment 480, as representatively illustrated at system data storage location 481. The ordinarily skilled artisan will recognize numerous system control methodologies that may be used in conjunction with the present invention without departing from the spirit and intended scope thereof.

Data logger process 451 may implement the functionality of data logger 240 in FIG. 2, that is, monitoring various inputs and system states that have been selected for debug tracking, formatting data indicative of characteristics of such inputs and system states in accordance with a predetermined data format, and storing the formatted data in memory such as debug data 484 in data memory segment 480.

Communication process 458 cooperates with the communication ports in 110 subsystem 410 to implement the procedures required for carrying out communications over a communication channel via the corresponding port 412, 414 or 416. Communication process 458 may, for example, perform data encoding and decoding, buffer overflow control and the like. Buffers and network stacks may be allocated in data segment 480, representatively illustrated at communication data storage location 488.

In certain embodiments, communication process 458 may implement an expansion protocol, referred to herein as Inter-Device Exchange Protocol (IDEP), by which communications between a master PCCS 200 and an expansion PCCS 200 are conducted, such as described above with reference to CCUs 110*a* and 110*b* in FIG. 1. IDEP allows control of expansion PCCS 200 by a master PCCS 200 using less overhead than would be required if such control were to be conducted through a standard network protocol, e.g., the Transport Control Protocol/Internet Protocol (TCP/IP) suite. IDEP may thus be deployed in a local area network setting and may have a payload format and content that is particular to power-centric system control and reporting. For example, IDEP may implement a simple command scheme, e.g., code words, and a local addressing scheme such that commands can be conveyed over a local area network in compact packages. Additionally, IDEP may be extendable so that, as new features are added to the present invention, system developers need only add the code for the new feature without changes to the transport mechanisms.

Communication process 458 may also implement Internet Engineering Task Force (IETF) RFC 5424, i.e., the Syslog protocol, by which notifications to external parties may be conveyed. Buffers and network stacks for IDEP and Syslog, as well any other protocol that may be used, e.g., Telnet and Simple Network Management Protocol (SNMP), may be allocated in data segment 480, such as in communication data storage location 488.

Debugger process 459 may implement the functionality of the debugger 222 by which processor states, process states, power control states, and the like may be tracked and stored as debug data location 484 in data segment 480 for system diagnostics. Debugger process 459 may be accessed and controlled through serial port 414. Through serial protocol commands, for example, debug levels may be selected, debug commands may be issued and debug data may be obtained and viewed. The types of data that may be tracked by debugger process 459 will vary with the application in which the invention is embodied. The ordinarily skilled artisan will recognize various techniques and data by which a debugger may be implemented in PCCS 200.

Power-centric control process 452 may implement the functionality of power-centric controller 250, outlet controllers 260 and auxiliary outlet controllers 280 in PCCS 200. In certain embodiments, power-centric control process 452 implements a state machine, to be described with reference to FIGS. 5 and 6.

Figure 5:
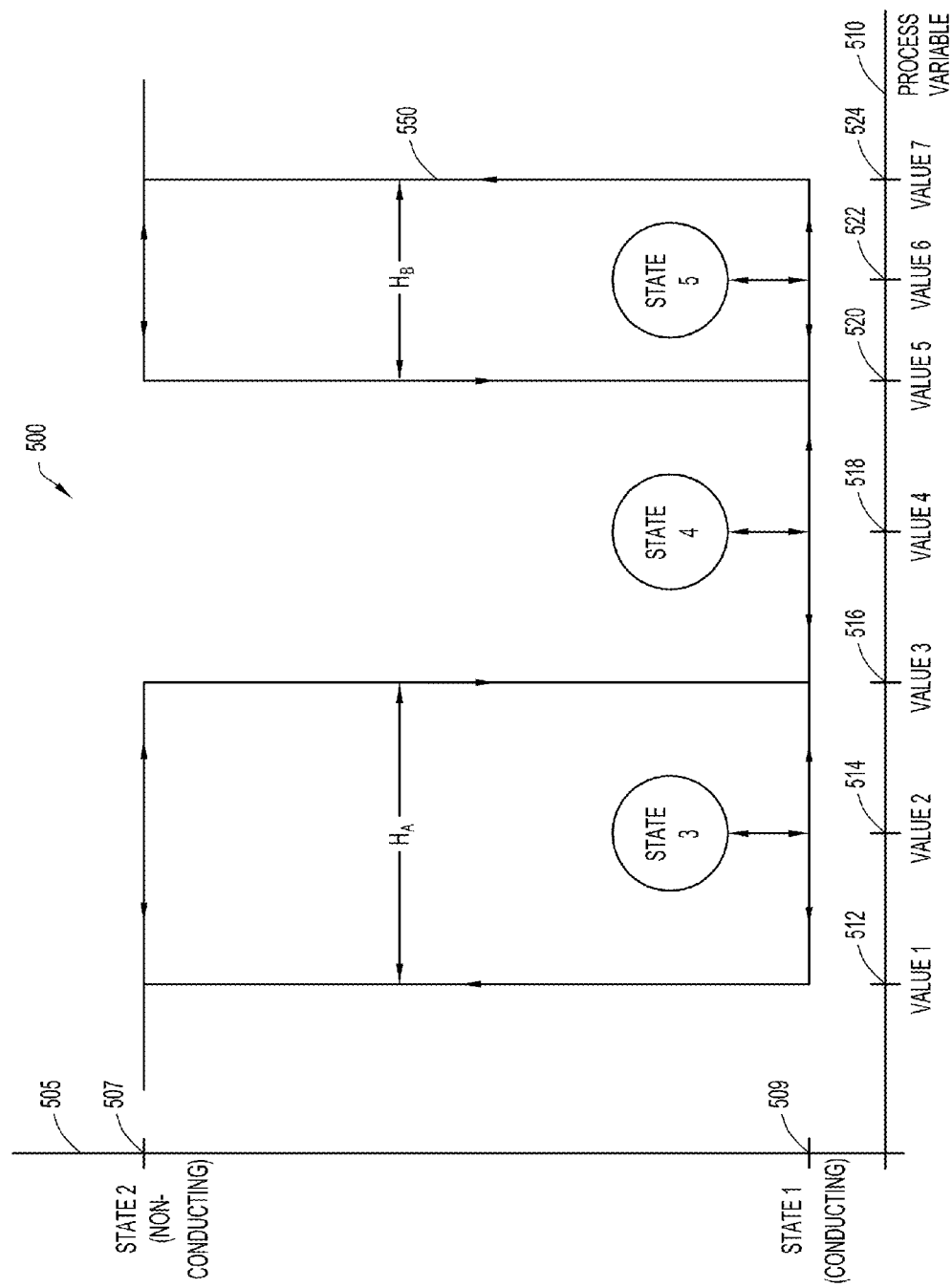
FIG. 5 is a diagram of an example process variable/state space for purposes of describing state transitions in embodiments of the present general inventive concept.

FIG. 5 is a conceptual diagram illustrating an exemplary process variable/state (PV/State) space 500 through which changes in state, represented as an ordinate 505 of space 500, of a control process, such as the state machine described below, occur at certain values of a process variable, represented as an abscissa 510 of space 500, can be visualized. While FIG. 5 is a visual tool for purposes of explanation, it is to be understood that the present invention is not limited to particular techniques by which the underlying principles illustrated in and described with reference to FIG. 5 can be realized in embodiments of the present invention.

As illustrated in FIG. 5, changes in state 505 occur in PV/State space 500 where a process variable 510 attains specified values 512-524, referred to herein as state transition boundaries, or simply transition boundaries. Transition boundaries may be defined through, for example, threshold values on the process variable. For example, if space 500 corresponds to conductive states at a particular outlet, outlet 265a for example, as a function of, for example, supply input voltage of a power source 112, transition boundary 512 may correspond to a minimum input voltage threshold, at which outlet 265a transitions into a non-conducting state 507 that disconnects an attached load from power source 112. Transition boundary 524 may correspond to a maximum input voltage threshold, at which outlet 265a is transitioned into non-conducting state 507 as well. When the process operates nominally, e.g., when the input voltage is between Value 3 and Value 5, outlet 265a may be in a conducting state 509, in which the load is connected to power source 112. Power-centric control process 452 may remain in one state, conducting state 509 for example, until the input voltage process variable 510 takes on a value corresponding to a transition boundary, maximum input voltage transition boundary 524 for example. When such value has been reached, power-centric control process 452 may transition to non-conducting state 507. The values assigned to process variable 510 and the state 505 of the process for any value of process variable 510 defines a path in PV/State space 500, referred to herein as a process trajectory 550. It is to be understood that power-centric control process 452 may embody multiple PV/State spaces 500, each with a corresponding process trajectory 550.

In certain embodiments, process trajectory 550 includes multiple routes between states 505. For example, process trajectory 550 may define a hysteresis curve, where the process will remain in one state over a range of values taken on by the process variable until another transition boundary is encountered. Using the input voltage example described earlier, power-centric process 452 may remain in non-conducting state 507, having transitioned into that state 507 upon input voltage 510 reaching transition boundary 524, until the input voltage drops to a lower value, Value 5 for example, corresponding to transition boundary 520. At transition boundary 520, power-centric control process 452 may compel outlet 265a into conducting state 509 and remain in conducting state 509 until a transition boundary is encountered. In certain embodiments, the distance between routes in hysteresis process trajectory 550, representatively illustrated as distances $H_A$ and $H_B$, are user-selectable values, as will be described below.

Process trajectory 550 may traverse routes that do not coincide with the plane illustrated in FIG. 5, i.e., the plane coinciding with the drawing sheet. State 3, for example, may correspond to a state in which some action other than compelling outlet 265a to conduct or not conduct is performed. Such actions may include issuing an alert, making a log entry, outputting a control signal at one or more signal output terminals 118, and so on. Numerous actions and corresponding states may be implemented in embodiments of the present invention without departing from the spirit and intended scope thereof.

It is to be understood that transition boundaries other than threshold values may be used in embodiments of the present invention, such as the occurrence of an event triggered by a specified condition. The ordinarily skilled artisan will recognize numerous other state transition conditions upon review of this disclosure.

Figure 6:
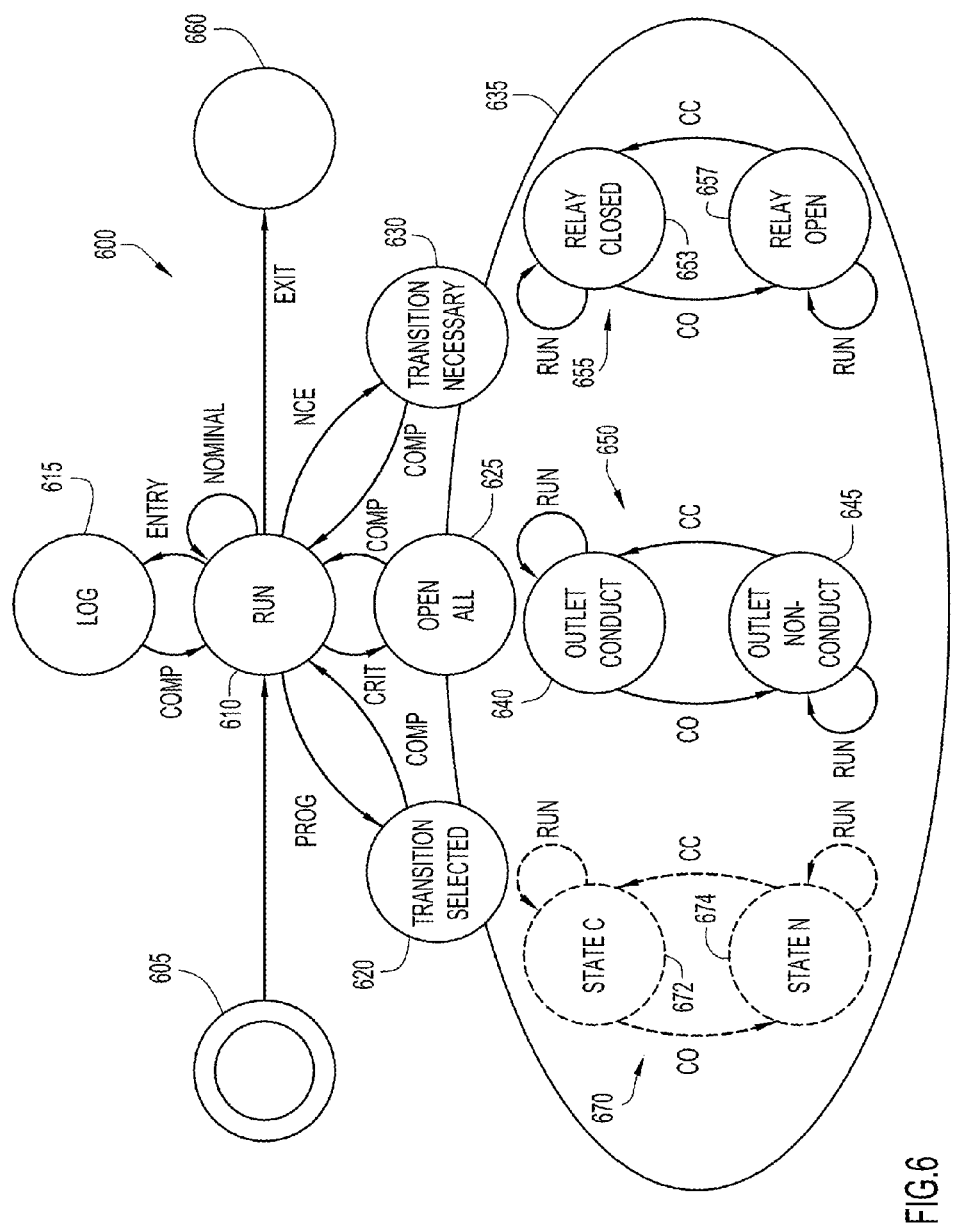
FIG. 6 is a diagram of a state machine by which the present general inventive concept may be embodied.
Figure 7:
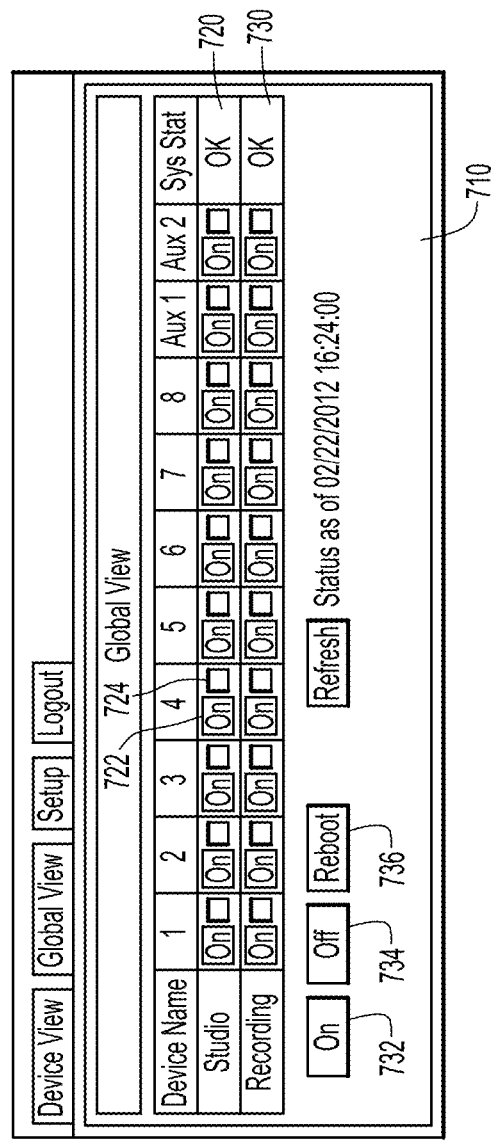
FIG. 7 is an illustration of a set of user controls in the form of a Web page by which a global control interface of the present general inventive concept may be embodied.

In FIG. 6, there is illustrated an exemplary power-centric control state machine 600 that may be implemented by power-centric control process 452. It is to be understood that state machine 600 depicts a simplified configuration of a possibly much more complex power control system. The exemplary process illustrated in FIG. 6 is provided for purposes of explanation of possible scenarios that may be encountered in an embodiment of the present invention. The ordinarily skilled artisan will appreciate other possible scenarios that may be implemented by way of the present invention upon review and understanding of this disclosure.

In an initial state 605, PCCS 200 is initialized with initial values of control parameters that define the state transition boundaries of state machine 600. State machine 600 then transitions into a Run state 610 and remains in Run state 610 as long as all process variables, e.g., voltage, current, temperature, humidity, input signal state, etc., are within operational bounds thereon established as nominal for normal operation. State machine 600 may transition out of Run state 610 upon a process event or upon being compelled into a Terminal state 660 upon an Exit event, which may occur upon ceasing control operations, such as by removing system operating power from PCCS 200. As used herein, a process event occurs when a value of a process variable exceeds a state transition boundary defining the event. Process events may include ENTRY events, Non-critical events (NCE), Critical events (CRIT), Programmed (PROG) events and Completion events (COMP). The transition boundaries defining these events may be appropriately established based on the severity of the consequences of crossing the boundary. It is to be understood that the present invention is not limited to the foregoing events. Indeed, embodiments of the invention that allow flexible programming of the state transition boundaries afford an essentially unlimited number of events and corresponding states.

State machine 600 may include a set 635 of outlet state machines, including one or more outlet state machines, representatively illustrated at outlet state machine 670. Outlet state machine 650 may be configured as, for example, a power state machine 650, by which the state of one or more power outlets 265 is controlled, or as an auxiliary outlet state machine 655, by which the state of one or more auxiliary outlets 285 is controlled. Outlet state machine 670 may comprise a State C 672, at which the outlet conducts, and a State N 674, at which the outlet does not conduct. In the case of power outlet state machines 650, State C 672 corresponds to a conductive state 640, in which conditioned power is provided to a load, and a State N 674 corresponds to a non-conductive state 645, in which power is removed from the load. In the case of auxiliary outlet state machines 655, State C 672 corresponds to a relay closed state 653, i.e., the NO contacts are closed, and State N 674 corresponds to a relay open state 657, i.e., the NO contacts are open. The state machines in set 635 may operate by similar mechanisms and, as such, the state machines will be representatively referred to herein as state machine(s) 670, where such state machines need not be distinguished one from another.

Each outlet state machine 670 is operable into one of states 672, 674 independently of the state or state transitions of other of the state machines 670. The outlet state machine 670 remains in the state 672, 674 into which it was most recently transitioned while state machine 600 is in Run state 610. Then, depending on the process event that causes state machine 600 to transition out of Run state 610, one or more outlet state machines 670 may receive a Compel Open (CO) event, which compels outlet state machine 670 into State N 674, or a Compel Closed (CC) event, which compels outlet state machine 670 into State C 672.

Upon an ENTRY event, state machine 600 may transition into Log state 615, in which certain information, such as values of the process variables that triggered the ENTRY event, the time of the event, and so on, are stored in log memory location 489 by data logger process 451. Thus, the state transition boundaries for an ENTRY event may be at any arbitrary value of any process variable. However, to maximize the ratio of useful information to the amount of storage required for logging data, the transition boundaries for an ENTRY event may be established at levels that may indicate potential problems in PCCS 200 operation, in power source quality, and/or in one or more loads connected to PCCS 200. Once the pertinent data have been logged, a COMP event occurs, at which point state machine 600 transitions into Run state 610.

An NCE event may occur upon detection of anomalies that require corrective action, but do not rise to the level of imminent equipment damage or system failure. In response to an NCE event, state machine 600 may transition into Transition Necessary state 630, at which one or more outlet state machines 670 receive a CO event and transition into State N 674 as necessary to counteract the anomaly. The selection of which outlet state machines 670 are compelled into State N 674 depends upon the circumstances surrounding the occurrence of the NCE event. For example, if the NCE event is caused by power consumption of one of the loads exceeding the transition boundary assigned thereto, the power outlet state machine 650 controlling the outlet to which the offending load is connected may transition into the Non-conductive state 645 to the exclusion of any other of the outlet state machines 670. As another example, if the NCE event is caused by environmental temperature exceeding the transition boundary established therefor, certain of the power outlet state machines 650 may transition into Non-conductive state 645 in accordance with a predetermined power-down scheme devised for reducing temperature. In certain cases, power outlet state machines 650 may alternately cycle between Non-conductive state 645 and Conductive state 640 in counter-cycle with other power outlet state machines 650. Once the conditions that caused the NCE event have been cleared, a COMP event may occur, whereby state machine 600 is compelled back into Run state 610. The ordinarily skilled artisan will readily recognize other useful NCE events and power-centric control schemes, including the use of auxiliary outlets 285 to control or otherwise signal external equipment, that can be used to counter-act such events upon review of this disclosure.

In certain applications, state transition boundaries on process variables may be established to trigger a CRIT event, at which time immediate, system-wide action should be taken to prevent system failure or equipment damage. In such an event, state machine 600 may transition into Open All state 625, which compels a CO event in all power outlet state machines 650, without necessarily affecting the state of auxiliary outlet state machines 655. Such a CRIT event may occur, for example, when an overvoltage of sufficient magnitude threatens not only all loads, but PCCS 200 as well. Once the offending process variables have returned to Nominal, a COMP event may drive state machine 600 into Run state 610. The ordinarily skilled artisan will recognize other criticalities that can be anticipated by prudent selection of state transition boundaries on the appropriate process variables.

As discussed above, arbitrary power control and system behavior of certain embodiments of the present invention may be achieved by user programming. During execution of such a user program, a PROG event may compel state machine 600 into Transition Selected state 620. In Transition Selected state 620, outlet state machines 670 selected per the user program may be transitioned into either State C 672 or State N 674. Once the selected outlet state machines 670 arrive at the selected state, a COMP event may occur and state machine 600 may transition into Run state 610. Certain user programs may comprise a number of program steps, where a first step is executed upon entry into Transition Selected state 620 in response to a PROG event. Upon the subsequent COMP event, Run state 610 is entered followed by a PROG event compelling the next step in the sequence. At each state in the sequence, one or more CO and CC events may be compelled in outlet state machines 670. Accordingly, numerous power-up power-down and signaling procedures can be implemented. User programs may be created, as will be described below, and stored in a memory location 486 in data segment 480.

It is to be understood that FIGS. 5 and 6 are conceptual diagrams; the same processes described through state transitions of a state machine may also be described through other conceptual drawings, such as flow charts. That is, the present invention is not limited to state machine embodiments; embodiments can be realized in a variety of ways, such as, for example, through hardware, including fixed and programmable logic, and a combination of hardware and software, such as by a microprocessor executing programmed processor instructions.

Returning once again to FIG. 4, user interface process 456 may provide remote access to memory location 483 through I/O 410. That is, user control instructions in memory location 483 may be retrieved by, for example, end user device 430 through user interface process 456. Once retrieved, the user control instructions may be stored in storage unit 436 and executed by processor 434 to generate a user control on UI 432. Through the generated user control, various parameters may be established, set and modified by manipulation thereof through HIDs 433.

In certain embodiments, various operations of system control process 454, user interface process 456 and communication process 458 may be coordinated to implement a Web server 457 by which user control instructions 483 are retrievable from memory through a properly formatted HTTP request. The user control instructions may include HTML compliant web pages having controls suitably embedded therein. Such embedded controls may be implemented by a suitable processor-executable instruction set, such as HTML form instructions, Perl, Java, Javascript, etc. Through the user controls in UI 432, the end user device 430 may alter power control data 482 and auxiliary control data 487, such as through another suitably formatted HTTP request. The ordinarily skilled artisan will recognize other techniques by which a remote processor, such as end user device 430, may set power control data 482 and auxiliary control data 487, including by other application network protocols or dedicated communication sessions through a specialized interface.

Various user controls will now be described with reference to Web pages illustrated in FIGS. 7-15B. It is to be understood that such implementation of the user controls is but one example of realizing remote control of PCCS 200. Moreover, it is to be understood that the description of the user controls carries with it the implication of the underlying processing infrastructure by which the corresponding control functions are implemented, where the ordinarily skilled artisan will recognize such underlying processing infrastructure for each such user control from the descriptions above.

The Global View page 710 displays the current outlet states 722 and system status 720 for a PCCS and any expansion units. Expansion units may be set up on the Links Setup page described below. Power outlets, in this case outlets 1-8, and auxiliary outlets, in this case Aux1 and Aux2, may be selected by selection control 724 and subsequently commanded to turn On (State C) by activation of "On" control 732, Off (State N) by activation of "Off" control 734, or Reboot (State N-pause-State C or, alternatively, State C-pause-State N) by activation of "Reboot" control 736, for multiple PCCS units, for example one (1) master, "Studio" for example, and a number of expansion units "Recording" for example. In certain embodiments, the number of total units is fixed, such as to be limited to, for example, sixteen (16) units. In certain embodiments, a user must have access credentials, e.g., a qualified username and password, at each expansion PCCS that is to be managed in order to have rights to control the expansion unit outlets. Other security measures may be implemented as well. For example, communications between a master PCCS and its expansion PCCSs may be encrypted using the same encryption key, i.e., each expansion PCCS must be configured to use the same encryption key as its master PCCS. In certain embodiments, each expansion PCCS must communication on the same protocol port with its master PCCS. However, it is to be understood that the present invention is not limited to any particular security scheme or manner by which communications between PCCSs are secured and/or isolated.

Figure 8:
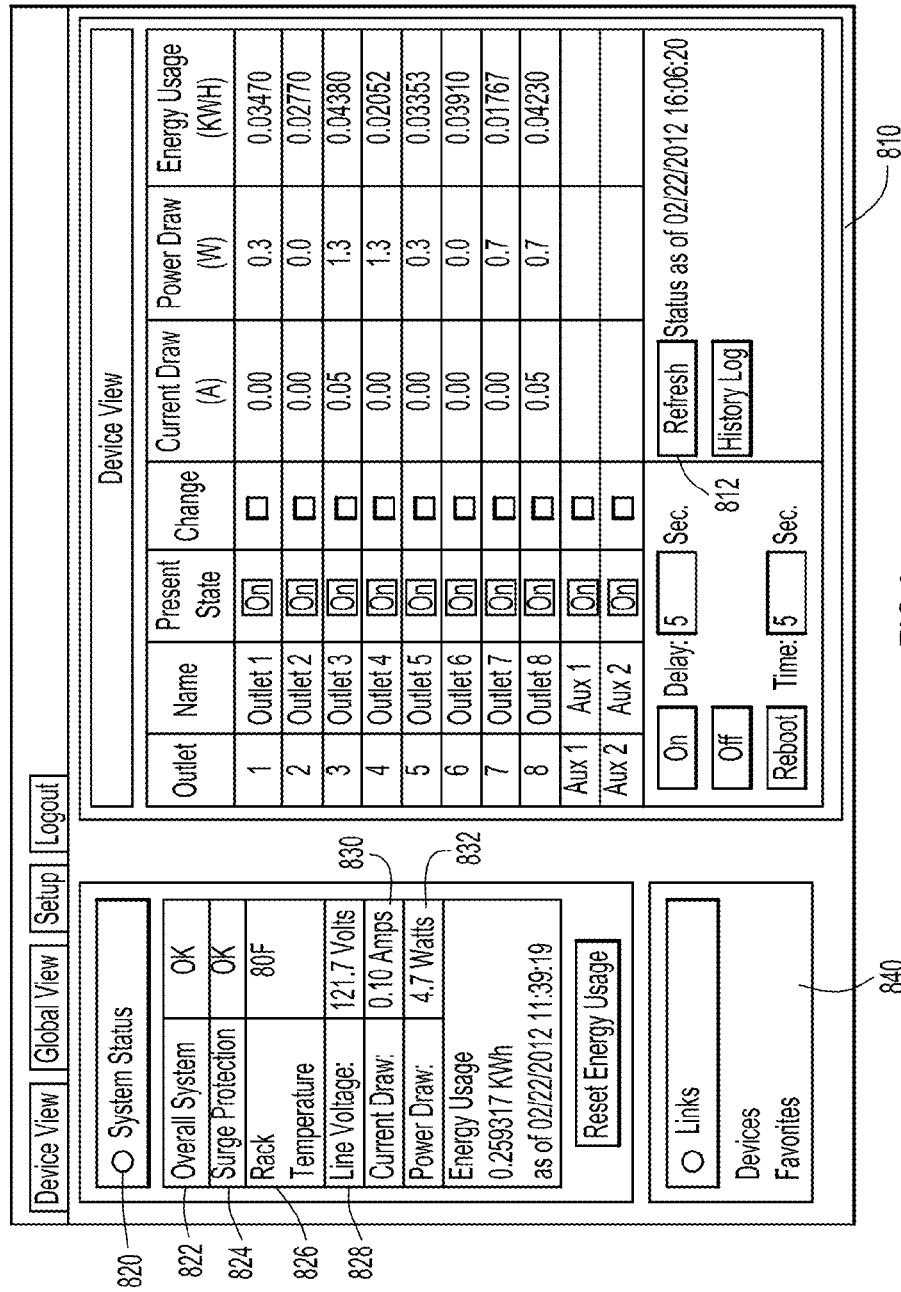
FIG. 8 is an illustration of another set of user controls in the form of a Web page by which a device view interface of the present general inventive concept may be embodied.

The Device View page 810 shown in FIG. 8 provides information and status for a particular PCCS as a whole, as well as for certain features, such as the status of individual outlets. Device View page 810 may provide basic control of individual outlets, as well. A status panel 820 provides system status, through, for example, Overall System control 822, which indicates whether the surge protection, rack temperature, line voltage, and current draw are at acceptable levels. Surge Protection control 824 indicates whether the surge protection is fully functional. Rack Temperature control 826 displays the temperature indicated to by a sensor connected to, for example, a terminal block on enclosure 270. If the temperature sensor is not connected, the temperature control 826 may display "NC" for Not Connected. Line Voltage control 828 displays a true-RMS AC input voltage. Current Draw control 830 displays the total current draw of all 8 receptacles in true-RMS amperes. For each power outlet, the Outlet Name, Present State (On/Off), Current Draw, Power Draw, and Energy Usage are displayed on Device View Page 810. Similar information is provided for the auxiliary outlets. To refresh the status information, a Refresh control 812 may be activated. Power Draw control 832 displays the total power draw of all 8 receptacles in Watts. Links control 840 may be provided for convenient navigation to locations on the network, e.g., other devices and/or favorite locations as described below with reference to FIGS. 15A-15B.

Complete setup and configuration of the PCCS is provided via several Setup web pages: Device setup page 910 in FIG. 9 configures basic device parameters; Network setup page 1010 in FIG. 10 configures network settings, including the network adapter, email, and time keeping; Network Reporting setup page 1110 in FIG. 11 configures SNMP, IDEP, and Syslog reporting; and User setup pages 1210 and 1220 illustrated in FIGS. 12A and 12B configure user accounts. Triggers setup pages 1310 and 1330 illustrated in FIGS. 13A and 13B, which configure system triggers and creates and modifies user triggers, and Sequences setup pages 1410 and 1430 illustrated in FIGS. 14A and 14B, which creates and modifies custom Sequences, allow a user to create user programs in the form of event definition and step sequencing. Links setup pages 1510 and 1550 illustrated in FIGS. 15A and 15B create and modify Expansion unit links and Favorite links.

Device Setup page 910 in FIG. 9 allows for the specification of basic device parameters: Device Name control 912 specifies the name label to be associated with the PCCS; Power Up Delay Time control 914 specifies the amount of time in seconds by which to stagger the manual turning on of multiple outlets; Reboot Time control 916 specifies the amount of time an outlet is to remain off during a Reboot operation; Temperature Display control 918 specifies whether to display temperature in degrees Fahrenheit or Celsius; User Accounts May Clear Shutdown control 920 specifies whether a non-administrative user is allowed to manually clear a persistent shutdown state; Serial Baud Rate control 922 specifies the baud rate to be used with the serial communication interface; Serial Port Requires Login control 924 specifies whether a serial communication session, such as through a terminal device, requires a user login operation; Auto Logout control 926 specifies the communication security timeout in minutes; Use History Logging control 928 specifies whether to maintain an internal log file; Allow Firmware Upgrade control 930 specifies whether the PCCS is in an upgradeable state; Outlet Name controls 940 allow for the specification of name labels for each outlet; Initial State controls 942 specifies the initial state of the corresponding outlet following a loss of power or the clearing of a shutdown event; and ICE control 944 specifies whether to activate inrush current elimination.

Network Setup page 1010 in FIG. 10 allows for the specification of network settings, including the network adapter, email, and time keeping. IP Setup control 1012 specifies whether to use Static or Dynamic Host Configuration Protocol (DHCP) for IP addresses. IP Address control 1014 specifies the IP address of the PCCS when in Static mode and displays the assigned IP address when in DHCP mode. Subnet Mask control 1016 specifies the subnet mask to be used when in Static mode and displays the assigned mask when in DHCP mode. Gateway control 1018 specifies the gateway address to be used when in Static mode and displays the assigned gateway address when in DHCP mode. DNS1 control 1020 and DNS2 control 1022 specify the first and second Domain Name System (DNS) server addresses, respectively, to be used when in Static mode and displays the acquired addresses when in DHCP mode. Web HTTP Port control 1024 specifies the port on which the internal Web server will communicate. Web HTTPS Port control 1026 specifies the port on which the Web server will communicate when using Secure Socket Layer (SSL) encryption. SSL Required control 1025 specifies whether the internal Web server is to use secure SSL encryption. Enable Telnet control 1028 specifies whether to enable the internal Telnet server. Telnet Port control 1029 specifies the port on which the internal telnet server will communicate. Enable Email control 1030 specifies whether to enable the sending of email messages. Email Server control 1032 specifies the IP Address of the Simple Mail Transport Protocol (SMTP) or the Extended SMTP (ESMTP) server to be used. Login Name control 1034 specifies the username for the mail server and Login Password control 1036 specifies the password for the email server. Return Address control 1038 specifies the return address of the internal email client. Auto Retry control 1040 specifies the number of transmission attempts prior to reporting the failed email transmission. Test Email control 1042 sends a test email message to the specified address. Set Time control 1044 specifies whether to use Manual or the Network Time Protocol (NTP) timekeeping. SNTP Server control 1046 specifies the address of the internet time server when using NTP mode. Time Zone Offset control 1048 specifies the time zone in which the PCCS is located. Use DST control 1050 specifies whether to automatically adjust for Daylight Savings Time. DST Start Date control 1052 specifies the Month, Week, Day, and Time that DST starts and DST Stop Date control 1054 specifies the Month, Week, Day, and Time that DST ends. Manual Time Set 1056 specifies the starting date and time when using Manual mode.

Network Reporting Setup page 1110 in FIG. 11 allows for the configuration of the Simple Network Management Protocol (SNMP), IDEP, and Syslog reporting. Enable SNMP control 1112 specifies whether to enable the SNMP v2c agent. Read Community control 1114 specifies the SNMP read community string. Write Community control 1116 specifies the SNMP write community string. SNMP Managers control 1118 specifies IP addresses for multiple SNMP managers. Traps Sent control 1120 specifies which specific SNMP traps are to be sent. IDEP Port control 1122 specifies the port to be used with the IDEP exchange protocol under which an expansion connection may be constructed and maintained. IDEP Manager control 1124 specifies the IP address of the IDEP manager. IDEP Status Broadcast control 1126 specifies whether to enable a status broadcast and the frequency of the broadcast messages in minutes. IDEP Event Reporting control 1128 specifies which types of events result in automatic and unsolicited transmission of information to the master PCCS. IDEP Encryption control 1130 specifies whether to use Advanced Encryption Standard (AES) encryption with a shared passphrase. Syslog Port control 1132 specifies the port to be used with a Syslog server. Syslog Server control 1134 specifies the IP address of a Syslog server.

Users Setup page 1210 in FIG. 12A allows for the creation, deletion, and editing of up to 8 user accounts. New User control 1215 instantiates an Edit User page 1220 illustrated in FIG. 12B, by which each user is assigned a unique username, through username control 1222, and password, through password control 1224. The user's password may be confirmed via confirmation control 1228. The username and password may control access to the PCCS through, for example, a login page (not illustrated). Edit user page 1220 may further include an email control 1226, by which the user's email address may be entered. Additionally, edit user page 1220 may include an outlet access control 1230 by which the user may be assigned access to specific outlet(s), such as by activating a corresponding check box in access control 1230.

User accounts may be of the Administrator or User type, where Administrators have access to all functions and Users are excluded from access to Setup functions. To assign Administrator access rights to a user, administrator control 1231 may be activated into a checked state. If administrator control 1231 is not in the checked state, the user has only User access. Once the user account data has been entered, save control 1232 may be actuated and, accordingly, the user account is activated. A close control 1234 may be incorporated to exit the edit user page without saving the entries or changes made.

Figure 13B:
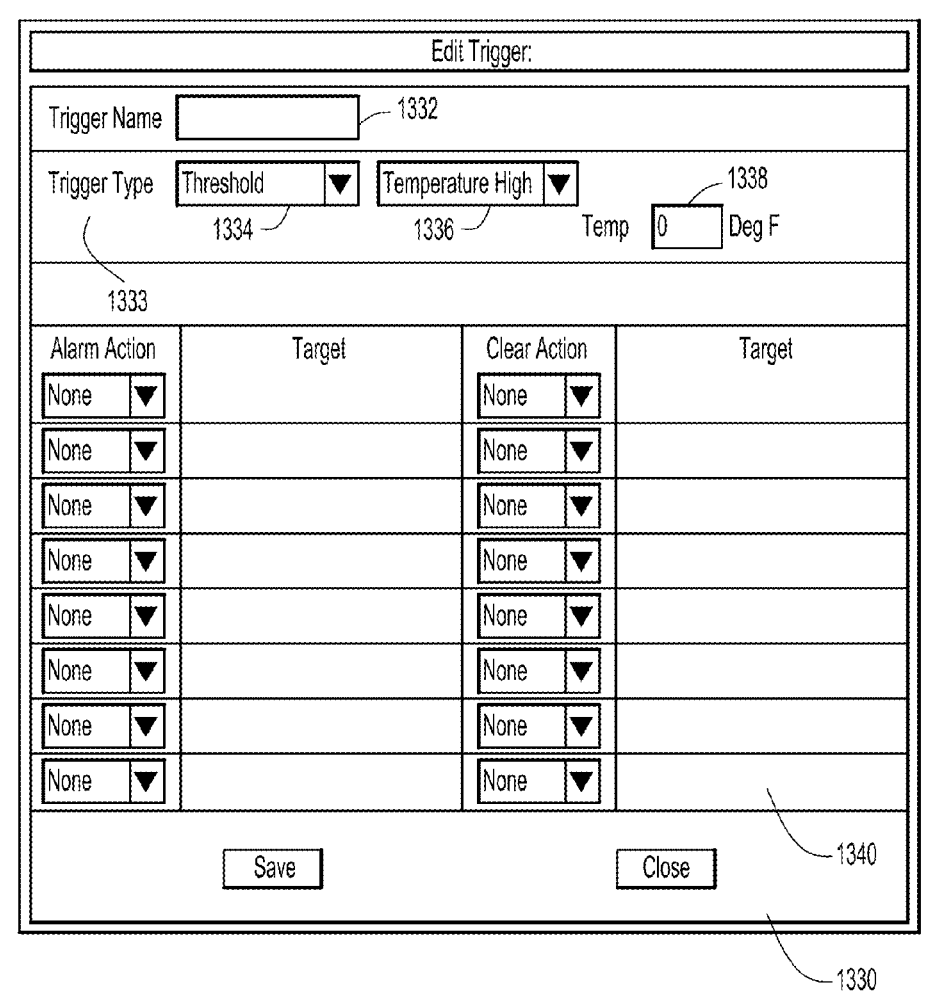

The Triggers Setup pages 1310 and 1330, illustrated in FIGS. 13A and 13B, respectively, allow for the modification of System Triggers and creation of User Triggers. System Triggers define the protective shutdown points for the AC outlets, and take precedence over all other actions, including User Triggers. Hysteresis controls 1312 specify the amount closer to nominal by which the associated process variable must return following the activation of a System Trigger for the condition to be considered clear. Using an over voltage shutdown point of 150V and a hysteresis of 7 as an example, the PCCS will enter a shutdown state when the line voltage exceeds 150V and will not leave the shutdown state until the line voltage drops below 150V−7V=143V. Over-Voltage Auto Shutdown control 1314 immediately shuts off all power outlets if the AC line voltage rises above the set value. In certain embodiments, by default, this feature cannot be disabled. Under-Voltage Auto Shutdown control 1316 shuts off all power outlets if the AC line voltage falls below the set value. Over-Current Auto Shutdown control 1318 shuts off all power outlets if the total current draw exceeds the set value. Once this has been triggered, the PCCS may stay in a persistent shutdown state until manually cleared by an authorized user. Over-Temperature Auto Shutdown control 1320 shuts off all outlets if the temperature sensed by a connected temperature sensor exceeds the set value. Once this has been triggered, the PCCS may stay in a persistent shutdown state until manually cleared by an authorized user. Self-Test Failure Auto Shutdown control 1322 shuts off all outlets in the event that the internal surge protection circuitry fails. Once this has been triggered, the PCCS may stay in a persistent shutdown state until manually cleared by an authorized user.

User defined triggers that have previously been created are displayed in a list control 1326. A new user trigger may be defined by activating New User Trigger control 1325, which instantiates Edit Trigger page 1330 illustrated in FIG. 13B.

Trigger Name control 1332 allows a User-defined trigger to be given a meaningful name. Trigger Type control 1333 allows for the definition of the user-defined trigger via Type control 1334, Condition control 1336 and Set-point control 1338. For triggers of the type "Threshold" selected through Type control 1334, several conditions can be selected through Condition control 1336, such as: Temperature High, which is triggered upon Temperature>Set Point and clears when Temp<Set−Hysteresis; Temperature Low, which is triggered upon Temperature<Set Point and clears when Temp>Set+Hysteresis; Voltage High, which is triggered upon Voltage>Set Point and clears when Voltage<Set−Hysteresis; Voltage Low, which is triggered upon Voltage<Set Point and clears when Voltage>Set+Hysteresis; Line Current High, which is triggered when Total Current>Set Point and clears when Current<Set—Hysteresis; Line Current Low, which is triggered when Total Current<Set Point and clears when Current>Set+Hysteresis; Outlet Current High, which is triggered upon Outlet X Current>Set Point and is cleared when Current<Set−Hysteresis; and Outlet Current Low, which is triggered when Outlet X Current<Set Point and clears when Current>Set+Hysteresis. Other trigger types may include Net Test, which is triggered upon an IP Address Ping Fails event and is cleared when IP Address Ping Succeeds; Schedule which is triggered at a particular date and time; and Contact Closure, which is triggered when auxiliary relay closes and is cleared when auxiliary relay opens.

For each user-defined trigger, the user may select one or more actions to be taken, such as those actions previously described, upon the trigger condition and the clear condition through Action control 1340.

Figure 14A:
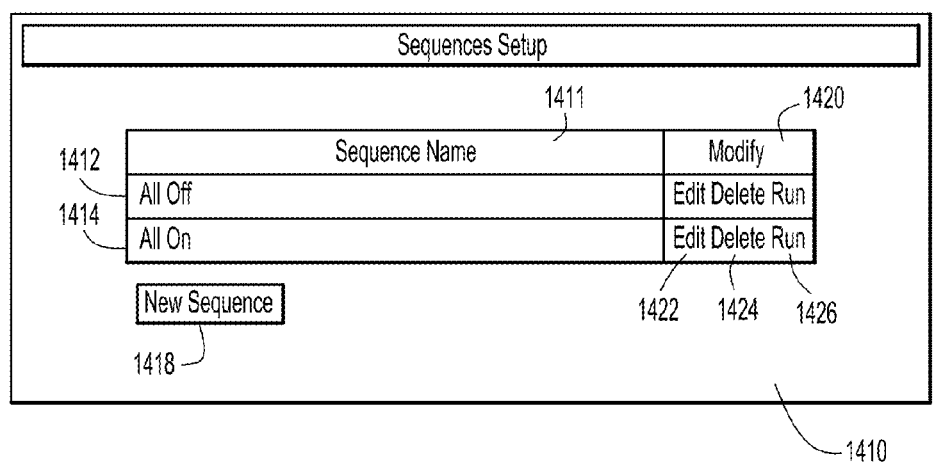

Sequences Setup pages 1410 and 1430, illustrated in FIGS. 14A and 14B, respectively, allow for the creation and modification of sequences. A sequence is a list of outlets, including auxiliary outlets, that will be turned On, Off, or Rebooted in a predetermined order with a specified delay time between each sequence step. Sequences previously established are presented in a list control 1411. As illustrated in FIG. 14A, a sequence 1412 entitled "All Off" may define a sequencing of outlets culminating in the shutdown of all outlets. A similar sequence 1414 entitled "All On" may activate all outlets in a defined sequence. Sequences may be modified through modification controls 1420. To execute a sequence, such as to test its operation, Run control 1426 may be activated. To delete a sequence, Delete control 1424 may be activated. To edit an existing sequence, Edit control 1422 may be activated. To create a new sequence, New Sequence control 1418 may be activated. The activation of either Edit control 1422 or New Sequence control 1418 will instantiate Edit Sequence page 1430 illustrated in FIG. 14B.

The new sequence may be given a unique meaningful name through Sequence Name control 1432, for example, "All On", "All Off" or "Stage Equipment On". Each step in a sequence may be defined through Step controls 1434, which may include a Pause control 1436 by which a time delay may be specified. The time delay may be specified from the previous sequence item. For example, creating a sequence with "Step 1, 1 second, Outlet 1, On" and "Step 2, 1 second, Outlet 2, On" will turn on Outlet 1 after 1 second, and Outlet 2 on 1 second after Outlet 1 has turned on. Outlet control 1438 may be provided by which a particular outlet targeted by the step may be selected, and an Action control 1440 may be provided by which the step action may be selected. Example actions may include turning the target outlet off, turning the target outlet on, or rebooting the target outlet. Once a sequence has been saved, such as by actuating Save control 1442, a control making it available for execution may be provided at, for example, the bottom of the Device View page 810 illustrated in FIG. 8. In certain embodiments, a user program may be created where a sequence may be selected as an action by control 1340 when creating or editing a User Trigger.

Figure 15A:
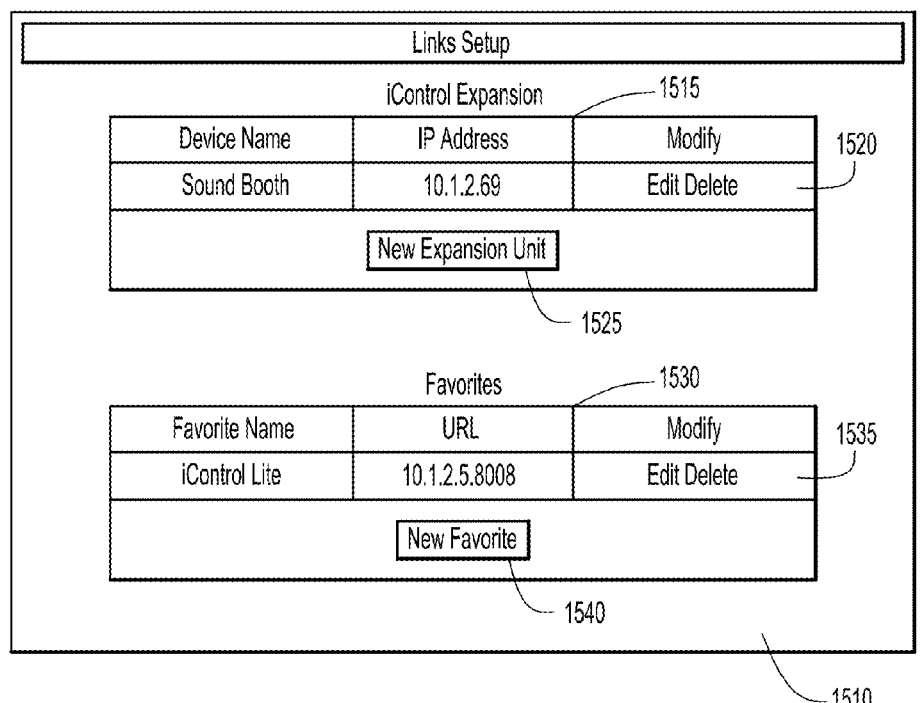
FIGS. 15A-15B are illustrations of yet another set of user controls in the form of a Web page by which a logical link control interface of the present general inventive concept may be embodied.
Figure 15B:
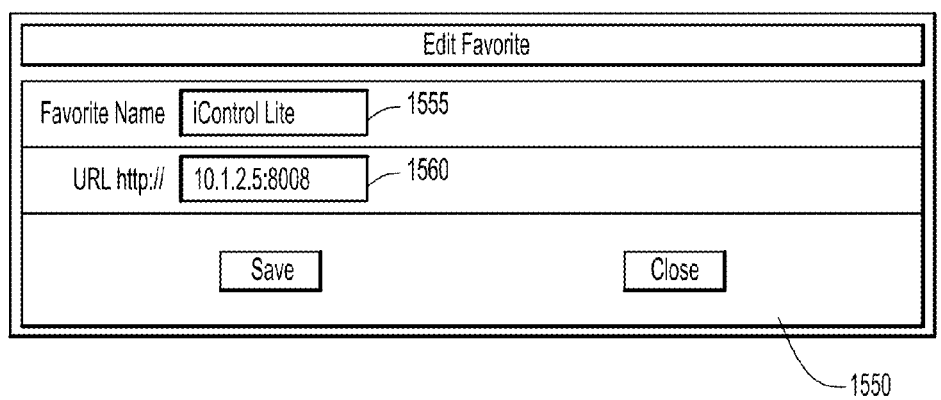

Links Setup pages 1510 and 1550 illustrated in FIGS. 15A and 15B, respectively, allow for the setup of PCCS expansion units, listed in list 1515 as one or more established expansion units 1520, and the setup of Web Favorites, listed in list 1530 as one or more established favorites 1535. Expansion units are other PCCS units which will be available for monitoring and control on the Global View page of the master PCCS unit. Favorites may be any internet address and may be used to set up shortcuts to earlier versions of the PCCS functionality, other equipment Web servers, or Internet web pages. A new expansion unit may be added to the list by activating New Expansion Unit control 1525 and a new Favorite may be added by New Favorite control 1540. Activating either of controls 1525 or 1540 instantiates an Edit control 1550, which, for purposes of explanation, is illustrated in FIG. 15B as an Edit Favorite control. Edit control may include a Name control 1555 to provide the Favorite with a meaningful name, and an address field 1560, to specify a URL of the Favorite. Saved Expansions and Favorites may be made available in the Links subsection 840 of Device View page 810 illustrated in FIG. 8.

Having described preferred embodiments of new and improved power-centric conditioning and control techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus comprising:
   a plurality of controllers, each configured to compare values assigned to at least one process variable against at least one control value thereof, the values being assigned to the process variable in accordance with at least one signal at corresponding ones of the controllers;
   a plurality of outlets communicatively coupled to the controllers, at least one outlet at each controller being configured to selectively provide an electrical voltage from an input voltage in accordance with the comparison of the values of the process variable with the control value, the outlets including an auxiliary outlet configured to provide a signal in accordance with a comparison of a value of at least one of the process variables with a corresponding control value, wherein electrical current delivered through the auxiliary outlet is less than the electrical current delivered through the outlets;
   one or more storage units communicatively coupled to the respective controllers through respective network interfaces to store remotely accessible user controls therein; and
   a remote processor configured to specify the control values over a communication network through the remotely accessible controls.

2. The apparatus of claim 1, wherein the user controls include a sequence control by which the outlets are operated by the remote processor into conducting and non-conducting states in accordance with a user-specified sequence.

3. The apparatus of claim 1, wherein the user controls include a trigger control by which the outlets are operated by the remote processor into conducting and non-conducting states in accordance with a user-specified trigger condition.

4. The apparatus of claim 3, wherein the trigger control includes an alarm action control by which an action is selected by the remote processor that is performed upon the value of the process variable meeting the trigger condition.

5. The apparatus of claim 4, wherein the trigger control includes a clearing action control by which an action is selected by the remote processor that is performed upon the value of the process variable being other than that by which the trigger condition is met.

6. The apparatus of claim 3, wherein the trigger control comprises:
   a set-point control to establish the control value; and
   a hysteresis control to select another control value at which a complementary state of the outlet is compelled.

7. The apparatus of claim 1, wherein the user controls include an access control by which access to the control value by the remote processor is excluded from a class of users.

8. The apparatus of claim 1, wherein the user controls include a link control by which the outlets coupled to at least one of the controllers are logically linked by the remote processor to another of the controllers.

9. The apparatus of claim 8, wherein the user controls include a global control by which a state of logically linked outlets is set by the remote processor.

10. The apparatus of claim 8, wherein the logically linked controllers communicate one with another via an expansion channel compliant with a network protocol other than that by which controllers that are not logically linked communicate.

11. The apparatus of claim 1 further comprising:
a plurality of monitors respectively coupled to the controllers, each of the monitors measuring at least the input voltage and assigning the measurements to values of corresponding input voltage process variables.

12. The apparatus of claim 11, wherein the monitors additionally measure one of input current, load current draw, load power draw and ambient temperature and the measurements of input current, load current draw, load power draw and ambient temperature are assigned to values of corresponding process variables.

13. The apparatus of claim 11, wherein the monitors measure signals from external equipment other than input voltage, input current, load current draw, load power draw and temperature and the measurements other than input voltage, input current, load current draw, load power draw and temperature are assigned to values of corresponding process variables.

14. The apparatus of claim 1, wherein the voltage provided through the outlets is an AC voltage and the signal provided through the auxiliary outlet is a DC voltage.

* * * * *